June 13, 1961 T. H. THOMASON 2,988,275

PRESET COUNTER APPARATUS

Filed Jan. 25, 1954 2 Sheets-Sheet 1

INVENTOR.
THOMAS H. THOMASON

BY Lippincott & Smith.
ATTORNEYS

June 13, 1961 T. H. THOMASON 2,988,275

PRESET COUNTER APPARATUS

Filed Jan. 25, 1954 2 Sheets-Sheet 2

INVENTOR.
THOMAS H. THOMASON
BY
Lippincott & Smith
ATTORNEYS

United States Patent Office 2,988,275

Patented June 13, 1961

2,988,275

PRESET COUNTER APPARATUS

Thomas H. Thomason, El Sobrante, Calif., assignor to Beckman Instruments, Inc., South Pasadena, Calif., a corporation of California Filed Jan. 25, 1954, Ser. No. 406,010
2 Claims. (Cl. 235—132)

Figure 1:
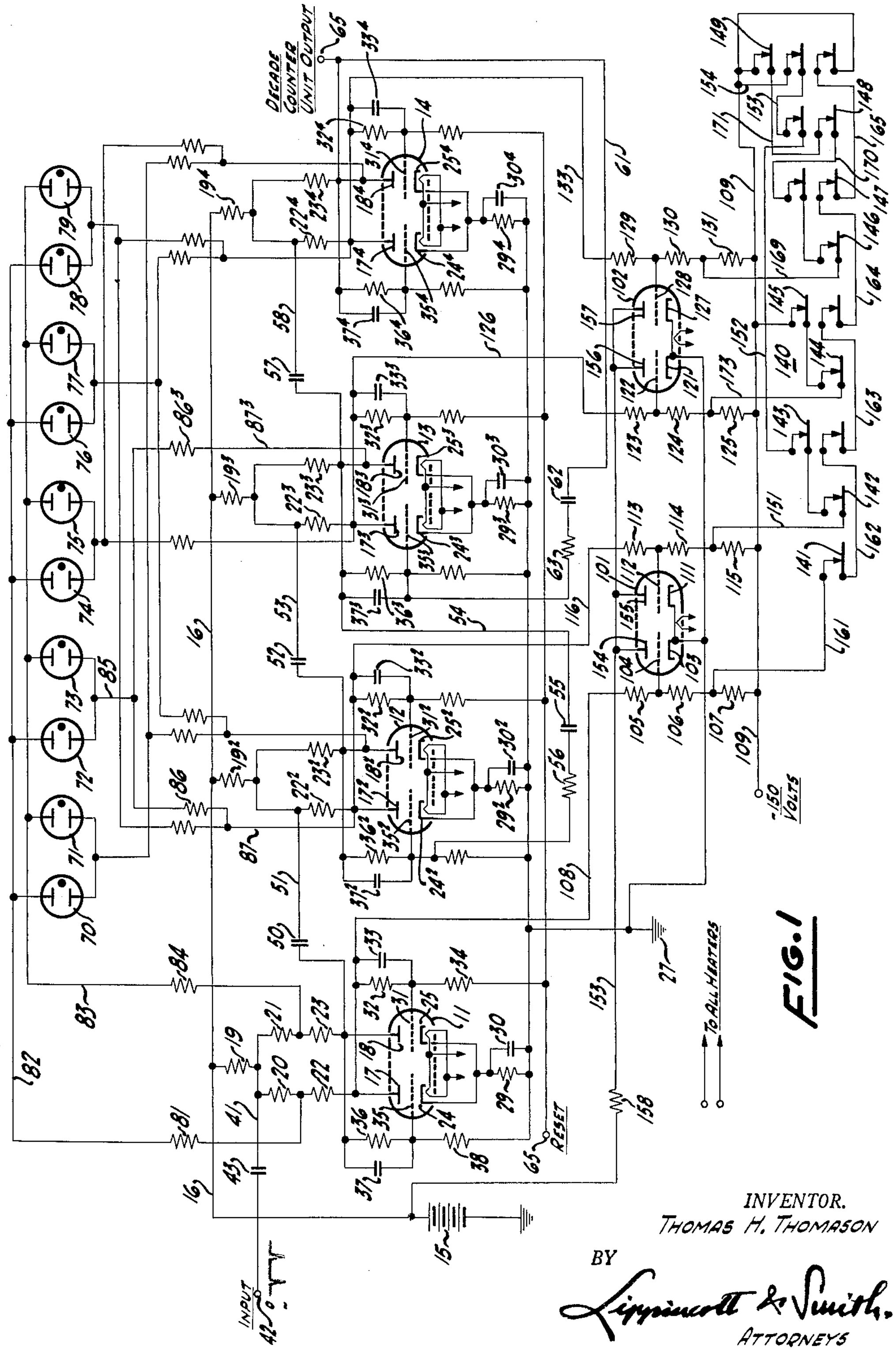

This invention relates to electronic counter circuits and particularly to a form of circuitry for use in combination therewith to determine or measure through counting methods and functions quantities such as number of objects, periods of time and the like.

The invention embodies an electronic counter circuit combined with a coincidence amplifier and appropriate apparatus to select a desired number of counts from the counting circuit and function under the control thereof to provide various forms of information. As the invention is constituted in one of its preferred forms it is of such a nature that the complete circuit is adapted to function solely as a counter unit, for which a decimal type of counter will be illustrated, in combination with the other components to be described. The apparatus and circuitry herein to be set forth also serves to count until a point is reached where a selected number of counts have been registered at which time the input to the counting units may be gated off or the apparatus may function as a recycling component and count, for instance, until a selected number of counts or pulses is received, at which time the counting units may be reset to zero and a suitable pulse output generated. Under such system an output signal becomes available at the time of recycling, provided this period is long enough, and the instrument as a whole is then in a state where another cycle of operation can be commenced.

In the more commonly known types of indicators it has been customary to include, as the counting components, a plurality of the so called Eccles-Jordan type trigger circuits which have two-step operational states and which are commonly known as a "bistable multivibrator," a "bistable trigger," a "flip-flop" or as a "binary." To establish the more commonly used decade form of counter it is usual to connect in cascade or concatenated fashion a plurality of such trigger or binary circuits and to utilize suitable feedback paths to trigger these components in such a way that a count of ten is readily established from a series of four separate binary circuits cascaded or concatenated and operated under the control of the incoming pulse signals. The trigger or binary circuits usually are in the form of a two-stage amplifier with the output of the second stage connected to the input of the first and the output of the first stage connected to the input of the second stage so that the circuits are cross-connected and the operational state of one is determined by the operational state of the other. Such circuits usually have operating potential applied to the anodes of the tubes forming the trigger or binary through a resistance path, which is at least partially common to both tubes, although the paths finally delineated divide so that each tube has its output through separate resistors connecting to the common element. In addition to the cross-connection between the output and input circuits there is usually provided a connection from the tube cathode to a lead maintained at an appropriate stable potential (such as ground). In a circuit of such character (bistable multivibrator, bistable trigger or flip-flop) the gain established in the loop is less than unity with no input and the circuit will remain in one of its two stable operating states, that is, either one or the other tube will be cut off and the opposite tube will be conducting. Triggering from one state of the stable states of operation to the other occurs when the loop gain is greater than unity.

A circuit of such character is usually coupled to a trigger or impulse signal source through an appropriate coupling input in such a way that the effect of the triggering is different on the two stages, depending upon which stage is conducting; and, in accordance with the change in conductivity from one stage to the other, appropriate voltage pulses may be developed to be transferred to the next succeeding binary of the cascade connected group. For operations where circuits of such character are so utilized that four binary or trigger stages are connected in cascade, they are arranged so that the output of one stage is adapted to trigger or control the operation of the succeeding stage, and so on.

It will be appreciated that the four circuits so combined will form to a scale of sixteen. By connecting a first feedback path from the third stage to the second and a second feedback path from the fourth stage to the third stage, the triggers or binaries may be converted in well known fashion to a system of decade counters. Under such conditions, with the four-stage cascaded trigger or binary, the circuit functions to operate as conventional trigger or binary up to the count of four. At the count of four the third stage is triggered, which functions to send a pulse through the first feedback network back to the second stage, thereby again triggering the second stage. In any binary or trigger circuit of this type, since it requires two input pulses at the first stage to trigger the second stage, this is equivalent to adding two input pulses and the unit under such conditions corresponds to a binary count of six. On the count of six, which is the equivalent of eight in the usual binary counter, the fourth stage is triggered, which will send a pulse through the second feedback network to trigger once more the third stage. This feedback pulse will have the same effect as if four additional input pulses had been applied to the first stage and the unit has a trigger or binary count of twelve stored in it. The cascaded binary units then operate in well known fashion as a triggered or binary scaler for the remaining four pulses, after which it resets to a zero count state. Under such system, by adding the equivalent of six input pulses, the scale of sixteen counter, which would result from four binaries cascaded or concatenated a conversion of the unit into a scale of ten or a decade counter is established.

At times in the operations of such counters it is important to be able to arrive at a reset condition, or some other condition designating the receipt of any particular number of pulses between zero, and, the maximum to which the counter is adapted to function, and, upon the attainment of such a number of controlling pulses, to reset the counter or to provide other appropriate form of indication of the attainment of the selected condition. According to the present invention, to achieve this objective there is combined with a decade counter, of the character set forth, a plurality of coincidence devices, the operation of which may be controlled from the counter circuit proper and of which the operational periods are determinable by a plurality of control instrumentalities, such as switches, relays, triggered tubes or any other similarly functioning component. The control, as will be made clear from the description to follow, is caused to become effective in accordance with the operative and inoperative periods of the components of the separate trigger circuits forming the decade counter. Further than this, the operation of the coincidence devices is arranged to be established in such a way that, in the absence of a presetting to determine a selected number of events, the coincidence devices are held in an inoperative or ineffective state as far as other controlled circuit components are concerned, but, with a control of the setting to determine any particular number of events, the coincidence devices are caused to be controlled from the decade counter components in such a way that one or more of the coincidence devices may be operative or inoperative as far as the condition of conduction therein is concerned. Then, with an arrival at a state where all coincidence devices are simultaneously caused to be in either a conducting or non-conducting state, an energy pulse is transferred to a suitable control component, there to become effective for utilization to provide the character of information or the form of circuit operation indication already referred to.

With the foregoing in mind it becomes evident that one of the primary purposes of the invention is that of providing circuitry whereby it is possible to obtain from a counter component a functioning of the unit as a decimal counter, in addition to its ability to count until a predetermined number of counts or control pulses are received, at which time the input may be gated off and an output signal indicative of that state made available.

Also a further objective of the invention is to provide for recycling the complete unit at such times as a preset number of control events occurs.

Other objects of the invention are those of providing circuitry for achieving the foregoing results which is generally simple in its nature and in which there is a wide freedom in the choice of controlling components, so that operation may be achieved through the use of the principle of control, herein to be described, but which will permit of considerable freedom in selecting the components for realizing the end result.

Figure 2:
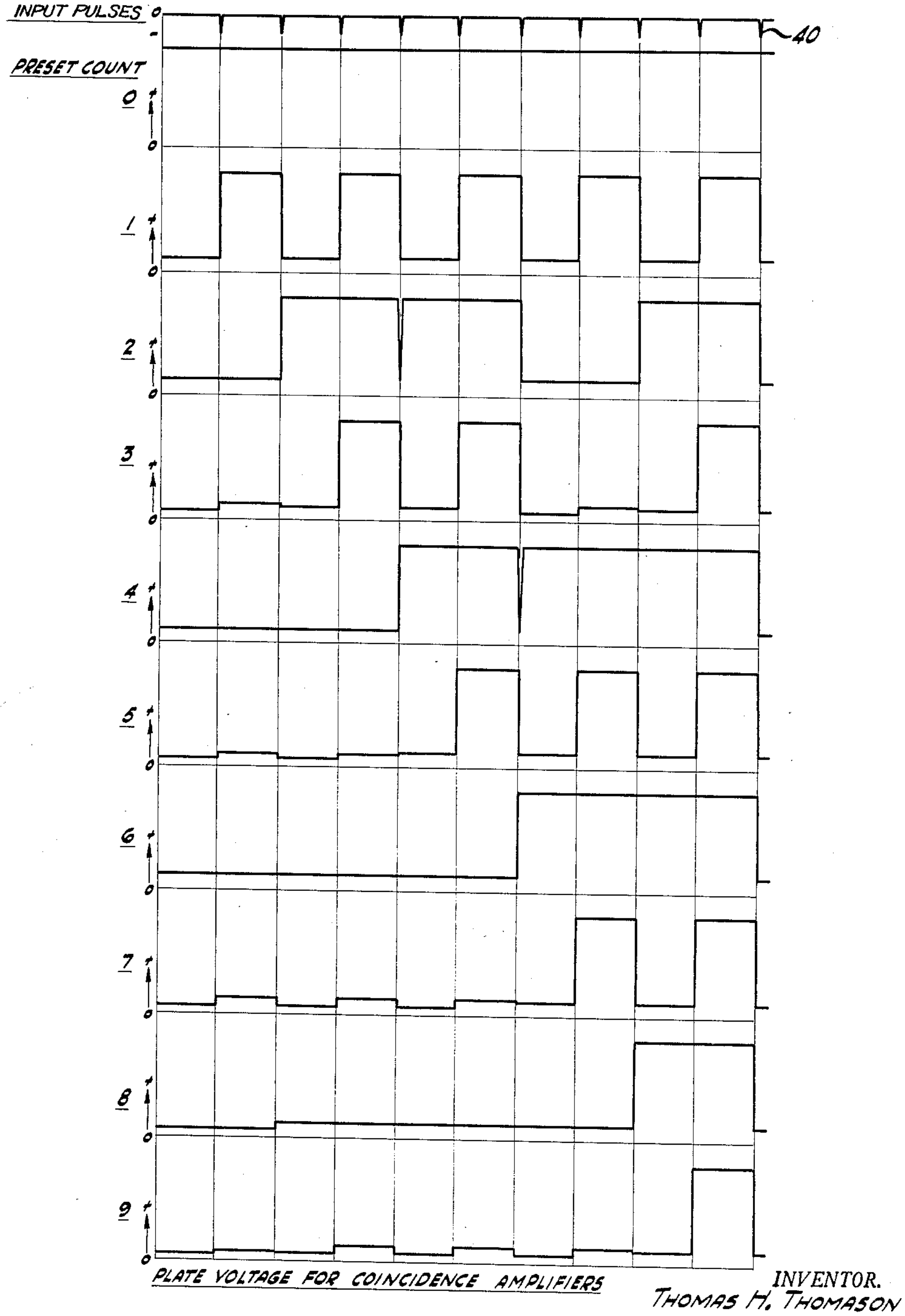

Other and further objects of the invention will become apparent and suggest themselves when the following description is considered in connection with the accompanying drawings, wherein:

FIG. 1 is a schematic circuit diagram of a decade counter in combination with a series of coincidence devices and control means therefor; and FIG. 2 is a series of curves schematically indicating attained operating voltages realized at the output of the several coincidence devices for one form of operation of the circuit.

Referring now to the drawings, the counter apparatus, per se, comprises a series of four cascaded or concatenated bistable trigger stages. These several stages are conventionally represented by the double triode tubes 11, 12, 13 and 14. Tubes suitable for such control are of many types but applicant has found that the so called type "5963" is particularly suitable. A tube of this form is a double triode to which suitable plate voltage is supplied from a suitable source 15 by way of conductor 16. This arrangement provides operating voltage upon each tube plate or anode 17 and 18 through a common resistor 19, and then through resistors 20 and 22 for the left-hand half of the tube and to plate or anode 17 and resistors 21 and 23 for the right-hand half of the tube or to plate or anode 18.

At this point it may be noted that components for supplying operating voltages or control voltages to any of the tubes 12, 13 and 14, comprising the second, third and fourth stages of the cascaded binaries, are indicated by like numerals with the exponents 2, 3 and 4 designating respectively components of the second, third and fourth binary stages.

The tube cathodes 24 and 25 are connected together and to ground 27 (or at point of fixed potential) through a cathode resistor 29 which is, for most operations, appropriately bypassed by the capacity 30. The plate or anode of the left half of the bistable trigger circuit or binary 11 is conected to the grid 31 of the right half of the tube by way of the resistor 32 which is bypassed by the capacitor 33, and a resistor 34 connects to a reset terminal 65 later to be described. Similarly, the right-hand tube anode or plate 18 connects to the left-hand grid 35 by way of the resistor 36 bypassed by capacity 37 and the grid is grounded through the resistance 38.

The foregoing describes generally the components comprising a binary or bistable trigger circuit of the so called and well know Eccles-Jordan type. Control input pulses, which illustratively may be of the character designated as the pulses 40 of FIG. 2 and diagrammatically represented by the wave form adjacent to the conductor 41, are supplied (from a source not shown) at an input terminal point 42 and then via the coupling condenser 43, so as to be applied concurrently through resistance paths 20, 22 and 32 to the grid 31 of the binary 11 and the resistances 21, 23 and 36 to the grid 35 of the same trigger or binary.

To exemplify one condition of operation of the tube and binary herein to be set forth, it may be considered as if the right-hand half of each tube of the cascaded series initially is conducting, in which event the left-hand half of each tube of the cascaded series will be blocked. This indicates, illustratively, a zero count or a reset state of the counter. Under these circumstances an input pulse series of a character such that the supplied pulse is negative is supplied to the first trigger or binary. While this pulse series is applied to both halves of the tube 11, its effectiveness is first apparent upon grid 31 of the right-hand half of the tube 18 where it reduces the grid potential (which for conductivity in the tube half had been in a region closest to its positive state) to a point where the current flow through the associated tube half is reduced. This condition immediately causes the potential at the tube plate 18 to rise with a result that by reason of the connection thereto at the left-hand grid 35, a current commences to flow through the left-hand half of the tube. This, in turn, reduces the potential at the plate 17 of the left-hand half of the tube, and the reduced potential is then applied at once to the grid 31 of the right-hand half of the tube to decrease still further the current flow and raise the potential at the plate 18. By following this procedure, a cut-off state is almost immediately reached for the right-hand half of the tube and a state of conduction is concurrently achieved in the left-hand half of the tube.

At the arrival of the next control pulse at terminal 42, the reverse condition occurs and the left-hand half of the trigger or binary 11 is rendered non-conducting and the right-hand half is then adapted to draw current.

From the foregoing, and as is also well known in the art, it is apparent that two incoming pulses must be received on the trigger or binary 11 to cause its assumed operational state to change from a condition where the right-hand tube half draws current and the left-hand tube half is blocked through a condition where the left-hand tube half draws current and the right-hand half of the tube is blocked back to the initially assumed condition of operation. Thus, a triggering of the trigger or binary 11 by two successively received pulses produces a count of 2 in the trigger or binary.

With this condition occurring it is apparent that, with a return to a state where the right-hand tube half of the trigger or binary 11 draws current, a negative pulse therefrom will be transferred via the coupling condenser 50 and the conductor 51 to trigger the second trigger or binary 12 in a fashion precisely corresponding to that already explained for the first trigger or binary 11; except, however, that, to trigger the second trigger or binary 12, it is necessary that two incoming pulses first be applied to the first trigger or binary 11. Consequently, to trigger the trigger or binary 12 from a state where the right-hand tube half conducts to a state where the left-hand tube half conducts and back to a state where the right-hand tube half conducts, requires the receipt of four incoming pulses on the trigger or binary 11.

With these conditions obtaining it is evident that the trigger or binary 12 then supplies through a coupling condenser, such as 52 and the conductor 53, a control pulse upon the third trigger or binary 13 which will trigger it. However, at this point in the circuit operation there is a feedback path between the right-hand half of the trigger or binary 13 and its anode $18^3$ through the conductor 54, condenser 55 and resistor 56 to the grid or control electrode $35^2$ of the second trigger or binary 12. Then almost instantaneously following the receipt of the fourth incoming pulse on the trigger or binary 11, not only is the trigger or binary 13 triggered, but the trigger or binary 12 is re-triggered independently of received impulses on conductor 41 to a state such that trigger or binary 12 is returned to a state which existed during the time period when the trigger or binary 11 first reached a state where the right-hand half of the tube became conducting. This means that effectively two counts have been added and the state of operation of the trigger or binary 12 at the instant corresponds to a count of six at the input to trigger or binary 11, making evident the fact that the trigger or binaries 11 and 12 function as conventional trigger or binary circuits up to the count of four and, with the receipt of the fourth pulse on the first trigger or binary 11, the third stage, that is, the third trigger or binary 13, is triggered and serves to send the feedback pulse through the first feedback network 54, 55 and 56, thereby triggering the second trigger or binary 12.

It has hereinbefore been pointed out that it requires two input pulses on the first trigger or binary 11 to trigger the second trigger or binary 12. The unit 12 having been so triggered, and then having been triggered again by the feedback trigger or binary 13, it will be evident that this is equivalent to adding two input pulses on the trigger or binary 11 so that on the receipt of the sixth pulse (which is the equivalent of eight pulses in the trigger or binary counter) the fourth trigger or binary stage 14 is triggered by the pulse, which is fed through the coupling condenser 57 through the conductor 58 at the time when the right-hand half of the trigger or binary 13 again commences to conduct to reduce the potential effective at the plate or anode $18^3$ thereof. This control pulse functions to provide a control of the character already described, and it cuts off current flow in the right-hand half of the fourth trigger or binary stage 14 and carries the left-hand half of this stage to a conducting status.

In the manner already explained, an interruption of current flow in the right-hand half of the fourth trigger or binary 14 causes the potential of the plate or anode $18^4$ to rise with the result that a pulse is fed back through the second feedback network through conductor 61, the condenser 62 and resistor 63 to provide a positive pulse at the grid $35^3$ of the third trigger or binary stage 13, thereby retriggering this stage according to the fashion that the feedback pulse from trigger or binary 13 has been explained as triggering the second trigger or binary stage 12. This re-triggering of the third trigger or binary stage 13, it will be appreciated, provides the same result as if four additional pulses had been applied at the input terminal 42, and the unit has a trigger or binary count of 12 stored in it. At this time the unit again operates as a trigger or binary scaler for the remaining four pulses required to re-set it to zero. Consequently, by adding the equivalent of six input pulses, the scale of sixteen has been permuted into a scale of ten.

The foregoing description is extremely general but is believed to be adequate to explain the general functioning of the decade counter comprising the four cascaded trigger or binary stages 11, 12, 13 and 14. It will be observed that the output pulse from trigger or binary 14, which becomes available to the conductor 61 to provide the feedback for triggering the third stage at the time of triggering the left half of the fourth stage to an operative state, also provides the pulse which becomes available at the output terminal 65 of the digital counter unit.

The four trigger or binary circuits, cascaded and operated as herein explained, provide a count from zero to ten and the output available at the terminal 65 appears as a pulse in the negative direction following the receipt of ten counts or pulses at the input terminal 42. If now it be desired that the mechanism count in another unit of ten, the output available at the terminal 65 may be arranged to trigger a second series of four similar cascaded binaries and incoming pulses at the terminal 42, when transferred through the first series of four cascaded trigger or binaries and thence transferred through the second series of four cascaded triggers or binaries (also with feedback as above explained), will provide a system wherein the counting may be from zero to one hundred, rather than from zero to ten. Similarly, a third set of four cascaded trigger or binaries, receiving as feedback the input signal that pulse output which appeared at the second series of triggers or binaries, will operate as another scale of ten counter and the count then may be from one hundred to one thousand. Addition of other stages of course increases the counting range similarly.

Counter devices of the type so far explained are generally well known, and illustrative of one form thereof is the so called "Preset Counter, Model No. 5425" which has been made and sold by the Berkeley Scientific division of the assignee corporation. A counter of such form is described in an Instruction Manual of that organization and was published March 10, 1953 and since that date such a manual has accompanied each such type component sold and delivered to purchasers.

As the operation of the cascaded triggering circuits continues, note can be made of the number of counts registered by way of a series of glow discharge tubes, generally designated by the numbers 70 through 79, the second number of the assumed digit indicating the number of input pulses required to cause flashing of the corresponding lamp. Thus, lamp 75 would flash at a count of five. Half the glow discharge tubes (for instance those registering zero and the even counts) included in the series 70 through 79 are supplied their highest voltage by way of the connection of the resistor 81 and conductor 82 to the junction of resistors 20 and 22. For a condition where the right-hand half of the triggering stage 11 is drawing current, and if it be assumed that the source designated at 15 is of the order of 300 volts and resistors 19, 20 and 81 respectively are of the values of the order of 27,000 ohms, 47,000 ohms and 220,000 ohms, respectively, there will be available on the conductor 82 a voltage positive relative to ground of approximately 145 volts for the assumed conditions. Similarly, the odd numbered tubes (such as 71, 73, 75, 77 and 79) may be considered as used to indicate the odd counts between one and nine in the series. These tubes obtain the highest potential by connection to a conductor 83 which connects to the junction of resistors 21 and 23 through a resistor 84 which is equivalent to resistor 81 in the lead 82. At times when the right-hand half of the first triggering stage 11 is conducting for the assumed conditions and source voltage hereinbefore assumed, there will be a voltage on the conductor 83 of the order of 110 volts as contrasted with that indicated on the conductor 82. With the change in the conduction of the triggering circuit or binary 11 from the right-hand half of the tube 11 to the left-hand half it may generally be considered that the potential on the conductor 82 drops to something of the order of 110 volts, while that on the conductor 83 rises to the assumed 145 volts.

The tubes 70 through 79 are preferably of the type known as type "NE-2" which "flash" at voltage generally considered in the range between 70 and 95 volts and which "hold" at a voltage in the range 55 to 60 volts. For the assumed conditions of operation, it will be observed that successive tubes have one electrode of each connected, and the other electrode elements are so arranged that alternate tube electrodes connect to the conductors 82 and 83. Consequently, at times when the right half of all of the triggering or binary circuits 11, 12, 13 and 14 become conducting, it is evident that only the neon tube 70 (to indicate zero input pulses)

or neon tubes to indicate an even number of input pulses can receive a sufficiently high positive potential to permit them to function; but for conditions when the right-hand half of the binary or trigger 11 is non-conducting, which would be indicative of an odd number of pulses received at the input terminal 42, the potential on the conductor 83 is at its maximum and one of the odd numbered tubes 71 through 79 can function, depending of course upon the state of conductivity of the trigger circuits or binaries 12, 13 and 14. With the connection shown, the operation of which need not be explained from what has already been stated, the flashing of the glow discharge tubes 70 through 79 can be calculated in accordance with the assumed number of input pulses serving to control the state of conductivity through either the right or left-hand half of the binary of triggering circuits 11, 12, 13, or 14.

To illustrate, and considering a simple case, it will be appreciated that upon the receipt of three triggering impulses the left half of the binary 11 will be in a conductive state, which is indicative of the fact that the voltage on the conductor 83 is highest. At this time it is also clear that the receipt of the third pulse causes the binary or triggering circuit 12 to operate in such a fashion that the left half of the tube is carried to a conducting state. This is indicative of a minimum potential at the tube plate $17^2$, which potential is then transferred by way of the indicated conductor to that terminal of the glow tube 73 which connects to the plate or anode $17^2$ by way of conductor 85, resistor 86 and conductor 87.

Under these circumstances, for the conditions hereinabove assumed, the voltage at the junction of conductor 87 and the tube anode $17^2$ may be considered as approximately 50 volts. In this assumed example it will be observed that not only does the conductor 85, which connects to one electrode of the glow tube 73, connect through resistance 86 and conductor 87 to the plate $17^2$ of the trigger or binary 12, but it also connects through the resistor $86^3$ and the conductor $87^3$ to the plate $18^3$ of the right half of the third binary 13. It has already been explained that at the count of three the right half of the binary 13 is in a conducting state which, of course, means that the potential at the tube anode $18^3$ is a minimum (which also may be assumed at 50 volts for the conditions illustrated). Consequently, the connection is such that it then provides for the assumed condition a potential of 95 volts between conductor 83 and conductor 85.

For the conditions assumed, it is clear that the lamp 73 (to indicate a count of three) can flash only at times when the left half of the trigger or binary 12 and the right half of the trigger or binary 13 are simultaneously in a conducting state. Bearing in mind the operational conditions already set forth, it will be appreciated that at a count of one the right half of each of the triggers or binaries 12 and 13 is conducting, which means that the highest potential is available at the plates $17^2$ and $17^3$ of the left half of each of these triggers or binaries so that with the potential at plate $17^2$ controlling the lamp 73 cannot flash at the count of one. At the count of two, while each of the left half of trigger or binary 12 and the right half of trigger or binary 13 is conducting so that the potential at the plate thereof is at a minimum, the tube 73 will not flash because at this instant the right half of the trigger or binary 11 conducts, with the result that the potential on the conductor 83 is at a minimum and there is not sufficient voltage across the lamp 73 to permit it to flash. The condition for flashing at the count of three has already been explained. It will now be explained that at the even counts for the remainder of this series of ten the lamp 73 cannot flash because at those times the right half of trigger or binary 11 conducts with the result that the potential on the conductor 83 is at its minimum and, regardless of what happens at the other terminal of the tube 73, the voltage across its electrodes will be insufficient to cause it to flash. For conditions where the right half of the trigger or binary 11 is non-conducting, so that the voltage on the conductor 83 is at its highest point (and these conditions occur for all odd counts, such as the counts of five, seven and nine which are yet to be considered), it will be observed that the right half of the trigger or binary 13 is non-conducting at the count of five, the left half of trigger or binary 12 is non-conducting at the count of seven and the right half of the trigger or binary 13 is non-conducting at the count of nine. These operational conditions preclude the operation of the glow tube 73 at any time other than at the count of three.

By determining the number of other stages in the decade counter which are operative, it may be ascertained that there is not sufficient voltage across any other glow discharge tubes of the series 70 through 79 to cause its operation or "flashing."

Considering now a condition where it is desired to provide a suitable means whereby a definite indication of the total number of counts received for any selected number of input pulses, which would serve to recycle the complete counting mechanism or to provide an indication of any number of complete units of counts, a coincidence circuit, including a plurality of control devices, is exemplified in the form of the double triode tubes 101 and 102. These tubes are shown as electronic or thermionic devices for illustrative purposes and as triodes for simplicity of illustration. However, it is to be understood that other forms of coincidence devices, wherein the current flow therethrough can be controlled, may be utilized and include, for illustrative purposes, diodes or even transistors. Each of the coincidence devices 101 and 102, which collectively may be looked upon as comprising four separate coincidence devices, is connected to a similar component of a related trigger or binary unit.

The left half 103 of the tube 101 has its control grid 104 connected from one end of a voltage divider, comprising the resistors 105, 106 and 107, through the conductor 108 to the plate or anode 17 of the left half of the binary or trigger circuit 11. The other end of the voltage divider is connected to a conductor 109 to which there is applied a suitable source of negative biasing voltage. Similarly, the right half 111 of the tube 101 has its grid or control electrode 112 connect to a voltage divider comprising resistors 113, 114 and 115, which voltage divider connects at one end by way of conductor 116 to the plate or anode $17^2$ of the left half of the binary or trigger 12 and at the other end of the voltage divider to the conductor 109 to which the negative biasing voltage is applied. A similar connection is made for the left half 121 of the coincidence device 102 of which the grid or control electrode 122 is connected to a voltage divider comprising resistors 123, 124 and 125 connected at one end to the biasing voltage on conductor 109 and at the other end through conductor 126 to the plate or anode $17^3$ of the left half of the trigger or binary 13. Lastly, the right half 127 of the coincidence device 102 has its grid or control electrode 128 connected to a voltage divider comprising resistors 129, 130 and 131, of which one end connects to the biasing voltage on the conductor 109 and the other end connects through conductor 133 to the plate or anode $17^4$ of the left half of the trigger or binary 14. Consequently, with all resistors of each voltage divider included in circuit between the negative biasing source connected to the conductor 109 and to one of the plates or anodes of the left half of one of the triggers or binaries 11, 12, 13 or 14, it will be apparent that the biasing voltage applied to the grid elements 104, 112, 122 or 128 will be determined by the state of conduction through the section of the trigger or binary to which the appropriate grid is connected.

The voltage dividers 105, 106, 107; 113, 114, 115; 123, 124, 125; 129, 130, 131, respectively, are each of such character that, regardless of the state of operation of the left half of any of the trigger circuits or binaries 11, 12, 13 and 14, the coincidence devices 103, 111, 121 and 127 will all be held in an inoperative state if the section of each voltage divider comprising resistances 107, 115, 125 and 131 can be short circuited to provide increased negative bias on the grids 104, 112, 122 and 128. For a condition where it is not desired to ascertain any particular number of incoming pulses or to preset the operating characteristics of the counter mechanism according to any pre-established operating criterion, a switching unit, broadly designated at 140 and comprising a group of switches, is adapted to be closed to maintain all of the resistors 107, 115, 125 and 131 in a short circuited state and the coincidence devices inoperative.

The switches for a decade counter are nine in number and in some instances consist of a single contact only (as shown by FIG. 1, the single contact switches 141, 142, 144, 146 are used to indicate one, two, four and six counts). For other instances a double contact switch, such as 143, 145, 147, 148, is utilized (such as for three, five, seven and eight counts as shown by FIG. 1) and in another instance a three-contact switch 149 may be utilized (as illustrated, for indicating the count of nine) the combination of switches comprises what will herein be termed a switching matrix.

If all of the switches 141 through 149 are in the closed position (as indicated) it will be observed that provision is made for short circuiting all of the resistors 107, 115, 125 and 131. However, with an opening of any one of the switches 141 through 149, it will be observed that the short circuit around one or more of the resistors 107, 115, 125 and 131 is removed and the functioning of the therewith associated coincidence device is then determined in accordance with the conductivity of the binary or trigger circuit with which the coincidence device is connected.

It will be observed from the indicated arrangement that for a condition of zero count, in accordance with what has been above stated, the right half of each trigger or binary 11, 12, 13 and 14 becomes conducting and accordingly, even if all of the resistors 107, 115, 125 and 131 of the voltage dividers are included as a part of the voltage divider therewith associated so that all of the coincidence devices 103, 111, 121 and 127 can draw current, there will be a continued steady-state current through each. However, if all of the switches 141 and 149 are closed, which also may be an indication of zero count, all of the resistors 107, 115, 125 and 131 of the voltage dividers are short circuited and the biasing source connected to the conductor 109 is of sufficient magnitude to carry all of the coincidence devices 103, 111, 121 and 127 to an inoperative state and to hold the condition steady, so that there is no abrupt change in the potential on the common output conductor 153 to which the plates or anodes 154, 155, 156 and 157, respectively, connect and to which appropriate voltage from the source 15 is applied through resistance 158 and the conductor 153. The output resistance 158 is made high relative to the plate resistance of any of the tube halves 103, 111, 121, 127 when these tube halves are in a conducting state. Where the tubes just described are of the type known in the art as the "5964" type, the plate resistance in a conducting state is of the order of 8,000 ohms and under such conditions the resistance 158 may be chosen of the order of 47,000 ohms, which is adequately high to permit of a relatively high sensitivity of the device to select a transient effect.

If it be desired to select any number of counts of the system other than zero and the unit as a whole has been reset to zero, it can be observed that opening any of the switches 141 through 149 inclusive will carry at least one of the coincidence devices 103, 111, 121 and 127 to a conducting state. As the count progresses between zero and the assumed nine counts, the number of coincidence devices which conducts varies in such a way that, when the preset number is reached, all of the coincidence devices 103, 111, 121 and 127 are for the first time concurrently cut off. The result is that a relatively large positive transient is obtained at the output of the coincidence devices and appears on the conductor 153.

This information, in the form of the developed voltage pulse, when applied across the resistor 158, may be used either to re-set the unit to zero through an appropriate re-set circuit, to gate off the input pulses, to provide an alarm indication or to control any other form of apparatus made to be responsive to the development of a voltage drop across the resistors 158 produced as a result of the transient applied.

To illustrate the operation, if it be assumed that the device is to be preset to indicate a count of four, the switch 144 will be opened and the remaining switches closed. The closed condition of the switch 141 provides a short circuit about the resistor 107 because of the connection of one end of that resistor through conductor 161, the switch 141, the conductor 162 through the lower contact of the switch 143 to the conductor 163 to the closed lower contact of the switch 145 through the conductor 164 and the lower contact of the switch 147 to the conductor 165, and thence through the lower contact of the switch 149 back to the conductor 109, upon which the negative biasing voltage appears and at which conductor the opposite end of the resistor 107 is connected. The short circuiting of this resistor, in this fashion, holds permanently the tube section 103 of the coincidence device in a non-conducting state and, no matter what happens in the operation of the first trigger or binary 11, the operative state of the coincidence device 103 will not be changed.

Similarly, with the switch 142 closed the resistor 115 is short circuited by the connection to its upper terminal of the conductor 151 and the switch 142 to the upper contact of switch 143 to conductor 152 and thence through the upper contact of the switch 148 and conductor 153 to the middle contact of switch 149 and the conductor 154 to conductor 109 to which the lower end of resistor 115 connects and along which is also supplied the negative bias. Consequently, the coincidence device 111 is permanently held inoperative regardless of the state of operation of the second triggering unit or binary 12.

Similarly, both the upper and lower contacts of the switch 143 are closed at such time as the unit four is selected, and since it has already been explained that resistors 107 and 115 respectively short through a circuit including the lower contact and the upper contact of switch 143, further description of this form of circuitry need not be included.

At that point it will be observed that the assumed number of counts to be registered having been taken as four, the switch 144 is opened and consequently the resistor 125, which forms a part of a voltage divider which includes the resistors 123, 124 and 125, is included serially with the other components. Up until the time that four impulses are received at the input terminal 42 the right half of the trigger or binary 13, as hereinbefore described, was shown always to be conducting with the result that the left half of the binary or trigger 13 was non-conducting. The result was that the potential at the plate or anode $17^3$ which is available on the conductor 126 is at a maximum and the voltage is sufficient to hold the grid or control electrode 122 of the coincidence device 121 at a potential relative to the tube cathode such that for the applied potential at the tube anode 156 a current flow can occur. Consequently, the potential at the tube anode is at a minimum.

Because switches 146, 147, 148 and 149 are all closed when only the switch 144 is open it is seen that the resistor 131 is short circuited through conductor 169, switch 146, the upper contact of switch 147, conductor 170, the lower contact of switch 148, conductor 171, and the upper contact of switch 154.

Consequently, the only tube half of the group of coincidence devices which can be in a conducting state for selection of a count of four will be the tube half 121. Then, when four pulses have been received at the input terminal 42 it will be evident that the left half of the trigger or binary 13 is carried to a conducting state so that the potential available on the conductor 126 is reduced to an extent sufficient to apply a potential instantly effective at the grid 122, which is sufficient to cut off the tube. The potential at the plate 156 rises at this time and there is available upon the conductor 153 a pulse which is of positive polarity and adequate to provide the control effect across resistor 158.

The curves of FIG. 2 schematically indicate the voltage effective on conductor 153 for the preset count for various selected numbers within the counting range. The input pulses of negative polarity available at the input terminal 42 are indicated as the pulses 40. Ten such successive input pulses are shown, the first of a sequence of ten appears on the left and the last appears on the right. For a preset count of zero resulting at recycling, the closure of all switches 140 is such that the potential at the plates 154, 155, 156 and 157 is almost at a maximum. This effect is represented by the uppermost curve designated "preset count 0." For a condition where a single pulse only is to be registered and the switch 141 is open, it will be observed that the first time there is coincidence in the plate potential of all of the coincidence devices 103, 111, 121 and 127 will be at the time the first pulse is received, which is indicated by the rise of the plate voltage curve adjacent to the designation "preset count 1." The counts above described for an assumed operation, where a preset count of four is desired and where the switch 144 is open, is designated by the curve adjacent to the designation "preset count 4" where it will be observed that the indicated potential available on the conductor 153, because of the operating condition of the tube 156, first achieves the maximum value at a time which coincides with that at which the fourth pulse is received and the potential at the plate of all other coincidence devices is also at a maximum. If a preset count of nine is desired it will be observed from the lowermost curve marked "preset count 9" that the switch 149 is opened and then all of the resistors 107, 115, and 131 of the various voltage dividers are included in circuit but the resistor 125 is short circuited by virtue of the closed path via conductor 173, switch 144 and the upper contact of switch 145 to the conductor 109.

Various other combinations set forth similar operating conditions. Consequently, when any number other than zero is selected and the unit is reset it can be observed that at least one of the coincidence devices is conducting. As the count progresses the number of coincidence devices that conduct varies, and when at last the preset number is reached all of the coincidence devices are carried to an inoperative state and a relatively large positive transient is obtained at the output of the coincidence device.

Having now described the invention what is claimed is:

1. A counter including a plurality of bistable trigger circuits connected in cascade to produce negative voltage pulses uniquely related to the number of impulses received by the counter, a plurality of normally conducting coincidence devices of the same number as said trigger circuits and each having control means, power supply means, a switching matrix separately coupling said power supply to the control means of said coincidence devices for selectively maintaining one of the latter conducting in accordance with the matrix setting, said switching matrix comprising nine normally closed switches with at least five thereof having multiple contacts and connected together to form four circuits therethrough coupling said power supply to control means of individual coincidence devices with said switches corresponding to the digits one through nine of the decade counter, whereby operation of any one switch renders one coincidence device responsive only to a trigger circuit pulse corresponding to a count of the digit of the switch operated, means individually coupling said trigger circuits to the control means of separate coincidence devices for cutting off any conducting coincidence device upon production at the connected trigger circuit of an output pulse, and means connected to each of said coincidence devices and producing a control voltage upon simultaneous non-conduction of all devices.

2. A decade counter, comprising four bistable trigger circuits coupled together to form a scale-of-ten counting circuit, each of said bistable trigger circuits having a terminal for providing an electric potential that changes from one to the other of two values as that trigger circuit changes from one to the other of two operating states, whereby each of ten successive counts registered by said scale-of-ten circuit is represented by a unique combination of electric potentials at the aforesaid four terminals, and adjustable means for providing an electrical output indication of when a selectively set count has been reached, said adjustable means comprising four terminals, a ten-position switching matrix for supplying to respective ones of said last-mentioned terminals four electric potentials each having either of two values, selectively, under the control of said matrix so that each of the ten switching positions of said matrix provides a unique combination of the last-mentioned four potentials, said switching matrix comprising nine normally closed switches of which, relevant to said matrix, four are single-pole switches, four are double-pole switches, and one is a triple-pole switch, and circuit connections forming four separate circuits through said switches to respective ones of said four terminals of the adjustable means, one of said four circuits connecting in series one single pole switch and one pole of a double-pole switch, another of said four circuits connecting in series one of said single-pole switches and one pole of each of two of said double-pole switches and one pole of said triple-pole switch, another of said four circuits connecting in series one of said single-pole switches and one pole of each of two of said double-pole switches and one pole of said triple-pole switch, and still another of said four circuits connecting in series one of said single-pole switches and one pole of each of three of said double-pole switches and one pole of said triple-pole switch, four devices that become conductive and nonconductive, selectively, responsive to electric potentials supplied thereto, circuit means connecting each of said devices to a respective one of said last-mentioned four terminals and to a respective one of said first-mentioned four terminals so that each of said devices is jointly responsive to a potential supplied by said switching matrix and to a potential supplied by said counting circuit, each said device being non-conductive unless both of the potentials so supplied to it have selected values, a source of voltage, and an output circuit connecting all four of said devices in parallel across said source so that current flows through said output circuit when any one of said devices is conductive.

References Cited in the file of this patent

UNITED STATES PATENTS

| | | |
|---|---|---|
| 2,527,633 | Grignon | Oct. 31, 1950 |
| 2,574,283 | Potter | Nov. 6, 1951 |
| 2,615,127 | Edwards | Oct. 21, 1952 |
| 2,647,689 | Bower et al. | Aug. 4, 1953 |